Dec. 10, 1968   G. K. NEWELL   3,415,093

COTTER PIN SPREADING DEVICE

Filed Feb. 28 1966

INVENTOR.
George K. Newell
BY
*A. A. Steinmiller*
Attorney

United States Patent Office 3,415,093
Patented Dec. 10, 1968

3,415,093
COTTER PIN SPREADING DEVICE
George K. Newell, Level Green, Penn Township, Westmoreland County, Pa., assignor to Westinghouse Air Brake Company, Wilmerding, Pa., a corporation of Pennsylvania
Filed Feb. 28, 1966, Ser. No. 530,564
3 Claims. (Cl. 72—166)

ABSTRACT OF THE DISCLOSURE

A cotter pin spreading device stamped out of an integral flat blank of thin sheet metal and foldable into a form suitable for installation on a shaft. The folded form of spreading device comprises a pair of annular portions in spaced coaxial relation connected by a double-walled radial web which serves to spread the legs of a cotter pin. An apertured tab on one of the annular portinos is bent at right angles thereto to provide a guide for insertion of the pin at a point in diametrical relation to the radial web.

*Background of invention*

In certain applications because of limited accessibility, the use of a hammer and wedge for spreading the legs of cotter pins is difficult and even impracticable. It is a primary object of this invention, therefore, to provide a simple inexpensive device having a spreading means by which the legs of a cotter pin are spread into locking position automatically as the cotter pin is forced or tapped through a transverse opening in a pin, shaft or like member.

A further object of the invention is to provide a combination washer and cotter pin spreading device.

Other objects and advantages inherent in the invention will become apparent from the following description of the invention.

*Summary of invention*

According to the present invention, a blank of sheet metal formed by a stamping operation is subsequently shaped and bent to a desired form to provide a cotter pin spreading device wherein a pair of oppositely spaced parallel ring portions are interconnected at a point about the periphery thereof by a web portion and arranged with alignment means diametrically opposite the web portion between the ring portions. The parallel ring portions are provided with coaxial openings therethrough corresponding substantially to the periphery of a pin, shaft or like member on which the spreading device will be utilized, whereby a transverse cotter pin opening in the pin, shaft or like member is aligned with said alignment means and the diametrically opposed web portion to receive a cotter pin inserted through the alignment means and to appropriately guide the cotter pin as it emerges from its opening immediately above said web portion so that the legs are directed to opposite sides of the web portion to thereby effect spreading of the legs.

For a better understanding of the invention, reference may be had to the following more detailed description of the invention as illustrated by the accompanying drawings of which:

Figure 1:
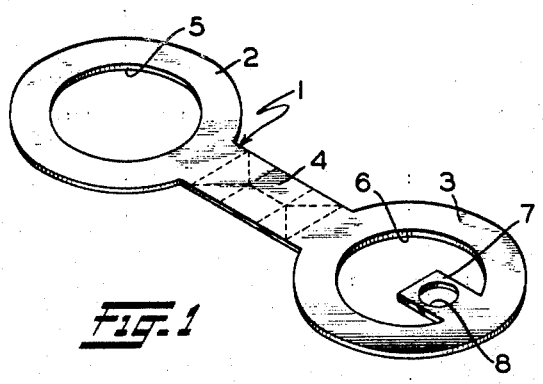
FIG. 1 is an isometric view of a blank of sheet metal formed as by a stamping operation prior to bending or deformation into a cotter pin spreading device.

Referring now to FIG. 1 of the drawings, a flat blank 1 of sheet metal, such as steel, is first formed with a stamping die in the shape illustrated. The blank 1 of sheet metal is characterized by similar ring-shaped segments 2 and 3 oppositely disposed and joined by an interjacent web portion 4. Ring-shaped segment 2 has stamped therein a circular opening 5, the diameter of which corresponds to a similar opening 6 stamped in ring-shaped segment 3, the periphery of which is interrupted with a rectangular tab 7 extending radially inwardly along an imaginary line between the centers of openings 5 and 6, said tab being formed with an alignment opening 8 therethrough, the axis of which is normal to said imaginary line.

Figure 2:
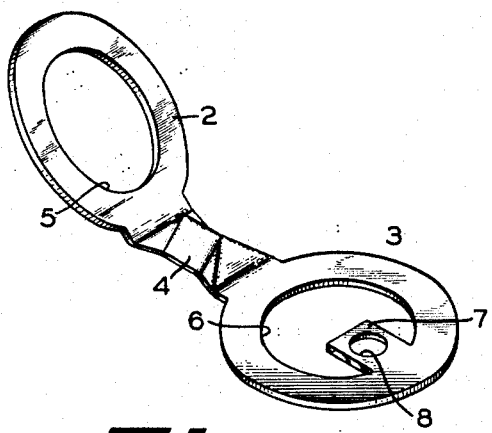
FIG. 2 is an isometric view of the blank of sheet metal of FIG. 1, shown in a partially folded condition.
Figure 3:
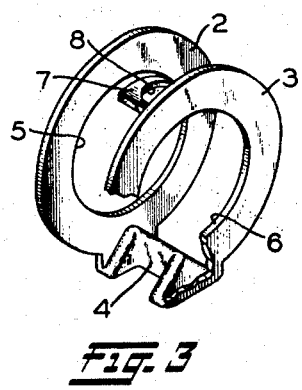
FIG. 3 is an isometric view of the cotter pin spreading device in its finished form in condition for application to a pin, shaft or like member, a portion being broken away for clarity.

A folding or forming die is utilized to bend the stamped blank 1 of sheet metal along the broken lines illustratively shown on the drawing of FIG. 1, into its finished form as shown in FIG. 3. FIG. 2 shows an intermediate form incident to the folding operation to aid in visualizing the transformation of the stamped blank 1 shown in FIG. 1 to the final form shown in FIG. 3.

The cotter pin spreading device shown in FIG. 3 is formed after the folding operation to provide two parallel spaced-apart ring-shaped segments 2 and 3 joined at a point about the outer periphery thereof by web portion 4, the thickness of which is double the original thickness of the sheet metal as a result of the folding operation, better seen in FIG. 2, to thereby provide a web portion having substantial rigidity. The tab 7 of ring-shaped segment 3 is deflected at the periphery of opening 6 so as to extend transversely between the ring-shaped segments 2 and 3 wherein alignment opening 8 in tab 7 is diametrically opposite the edge of web. 4.

Figure 4:
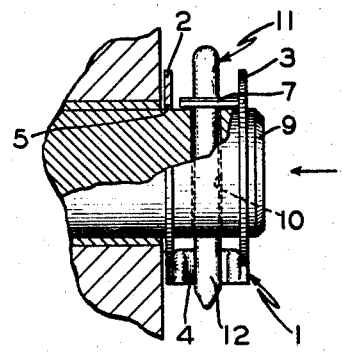
FIG. 4 is a view of the cotter pin spreading device as applied to the end of a pin, shaft or like member and showing a cotter pin engaged therein.
Figure 5:
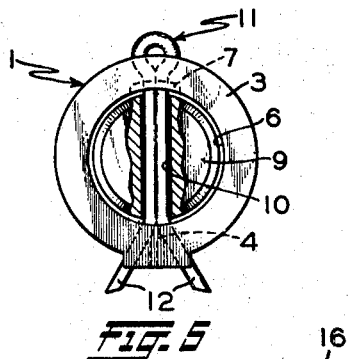
FIG. 5 is an end view looking in the direction of the arrow in FIG. 4.
Figure 8:
FIG. 8 is a view of a preferred type of cotter pin to be used with the cotter pin spreading devices shown in FIGS. 3 and 7.

The cotter pin spreading device, in the condition shown in FIG. 3, may be readily mounted over the exposed end of a pin, shaft or a like member 9 of a size receptive to the ring-shaped segments 2 and 3 as shown in FIGS. 4 and 5 wherein segment 2 is first slipped on shaft 9 followed by segment 3, after which the cotter pin spreading device may be rotated on shaft 9 until alignment opening 8 in tab 7 is aligned with a cotter pin passage 10. With opening 8 in alignment with cotter pin passage 10, a cotter pin 11 of the proper size may be driven into position by insertion through the alignment opening 8 which guides the pin into passage 10 in shaft 9. In FIG. 8 is shown a cotter pin of the preferred type having the ends of the legs 12 beveled oppositely to provide a V-shaped recess to effect a wedging action with the web 4 upon engagement therewith to initially facilitate deflecting the legs to opposite sides of the web after the pin emerges from passage 10 above the center-line of the web. The legs 12 are subsequently forced apart and directed to opposite sides of web 4 as the cotter pin is being completely driven into position, as by hammer blows on the "eye" end thereof.

With the cotter pin spreading device so mounted on a shaft 9 and engaged by cotter pin 11, it can be seen that ring-shaped segment 2 functions as a washer to absorb wear that would normally be taken by the cotter pin, and that ring-shaped segment 3, tab 7 and alignment opening 8 coact with the cotter pin 11 to secure the cotter pin spreading device against both axial and rotational movement on shaft 9.

Figure 6:
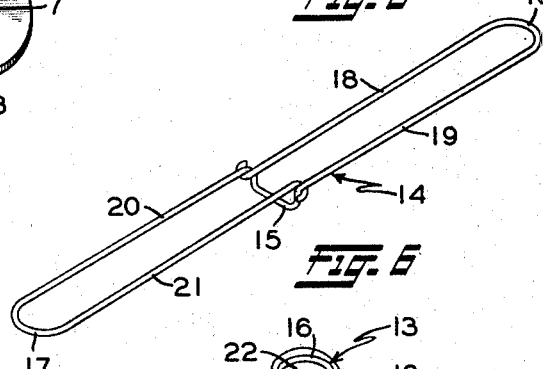
FIG. 6 is an isometric view of a second embodiment of the invention characterized by a continuous strand of wire shown in a partially formed condition.
Figure 7:
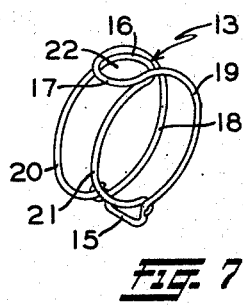
FIG. 7 is an isometric view of the cotter pin spreading device of FIG. 6 in its completely formed condition ready to be applied to a bolt, shaft or like member.

In a second embodiment of the invention, a continuous strand of wire preferably formed of a suitable grade of spring steel is utilized to provide a cotter pin spreading device 13 shown in FIG. 7 by being initially bent into a flat elongated loop 14 as shown in FIG. 6 and characterized by a cross-piece 15 interjacent oppositely disposed bight portions 16 and 17. This initial looped wire form 14 is achieved by bending approximately one-half of a continuous length of wire into a loop comprising substantially parallel sides 18 and 19 connected by bight portion 16 after which the cross-piece 15 is formed by bending the wire to extend transversely between the sides 18 and 19, the end of side 18 being attached to cross-piece 15 at the point of their juncture by some suitable means as for example by crimping. The remainder of the wire is then bent in the opposite direction in a like manner into a loop having substantially parallel sides 20 and 21 connected by bight portion 17, the end of side 21 being attached to cross-piece 15 at the juncture thereof as by crimping.

The final or finished cotter pin spreading device 13 is formed by bending the flat elongated loop 14 about a circular mandrel or die corresponding substantially to the size of a bolt, shaft or like member on which it is to be utilized such that the bight portions 16 and 17 overlap sufficiently to provide a guide opening 22 diametrically opposite cross-piece 15.

It is not deemed necessary to repeat the detailed operation of the second embodiment of the invention as the cotter pin spreading device 13 described therein coacts with a pin, shaft or like member and a cotter pin in a manner substantially similar to that described in the first embodiment of the invention to thereby provide the certain features set forth and more fully discussed heretofore.

Having now described the invention, what I claim as new and desire to secure by Letters Patent is:

1. A cotter pin spreading device stamped out of an integral blank of sheet metal and having two flat annular members connected by a flat web portion, said blank being folded so that said annular members lie in parallel spaced relation with the central openings thereof in substantially coaxial alignment and said web portion provides a double-walled radially disposed spreader portion rigidly extending between and supporting the annular members.

2. A cotter pin spreading device as claimed in claim 1 wherein said web portion is folded to terminate said radially disposed portion in double-walled triangular end portions perpendicular thereto and adjacent said annular members.

3. A cotter pin spreading device as claimed in claim 1, wherein one of said annular members includes a radially inwardly extending tab folded at right angles to the plane of the annular member from which it projects, said tab having an aperture therein diametrically aligned with said spreader portion through which a cotter pin is adapted to be inserted and guided to the spreader portion when the spreading device is mounted on a shaft that extends through the central openings of the annular members.

References Cited

UNITED STATES PATENTS

| | | | |
|---|---|---|---|
| 1,740,284 | 12/1929 | Cooke | 85—8.1 |
| 1,751,013 | 3/1930 | McMullen | 85—8.1 |
| 1,911,990 | 5/1933 | Cooke | 85—8.1 |
| 2,112,807 | 3/1938 | Cooke | 85—8.1 |
| 2,391,140 | 12/1945 | Dilley | 85—8.1 |
| 2,627,198 | 2/1953 | Johnson | 85—8.1 |

CHARLES W. LANHAM, *Primary Examiner.*

E. M. COMBS, *Assistant Examiner.*